United States Patent [19]
Bauer

[11] Patent Number: 5,615,917
[45] Date of Patent: Apr. 1, 1997

[54] APPARATUS FOR USE IN A VEHICLE OCCUPANT RESTRAINT SYSTEM

[75] Inventor: Barney J. Bauer, Fenton, Mich.

[73] Assignee: TRW Vehicle Safety Systems Inc., Lyndhurst, Ohio

[21] Appl. No.: 345,305

[22] Filed: Nov. 28, 1994

[51] Int. Cl.⁶ .................................................. B60R 22/20
[52] U.S. Cl. .................... 280/806; 280/801.2; 280/808; 297/480; 297/483
[58] Field of Search ............................ 280/801.2, 801.1, 280/808, 806; 297/480, 483

[56] References Cited

U.S. PATENT DOCUMENTS

| | | | |
|---|---|---|---|
| 4,213,638 | 7/1980 | Sacco et al. | 280/801.2 |
| 4,518,174 | 5/1985 | Sedlmayr . | |
| 4,616,850 | 10/1986 | Sedlmayr . | |
| 4,627,639 | 12/1986 | Sedlmayr et al. . | |
| 4,645,233 | 2/1987 | Bruse et al. . | |
| 4,925,212 | 5/1990 | Motozawa | 297/480 |
| 5,294,150 | 3/1994 | Steffens, Jr. | 280/801.1 |
| 5,295,714 | 3/1994 | Fohl | 280/801.1 |
| 5,330,228 | 7/1994 | Krebs et al. | 280/808 |
| 5,431,448 | 7/1995 | Ball et al. | 280/801.2 |

FOREIGN PATENT DOCUMENTS

| | | | |
|---|---|---|---|
| 221297 | 5/1987 | European Pat. Off. | 280/801.2 |
| 563728 | 10/1993 | European Pat. Off. | 280/806 |
| 2203629 | 10/1988 | United Kingdom | 280/806 |

*Primary Examiner*—Eric D. Culbreth
*Attorney, Agent, or Firm*—Tarolli, Sundheim, Covell, Tummino & Szabo

[57] ABSTRACT

An apparatus (40) includes a movable webbing guide (28) which guides seat belt webbing (26) extendable around an occupant (11) in a vehicle seat (12). A webbing guide stop (70) is movable between different stop positions for stopping movement of the guide (28). The stop (70) is moved between the different stop positions using a positioning screw (64) having one end connected to the stop (70) and the other end operatively connected with a motor (60). A first sensor (80, 84) senses at least one characteristic of an occupant (11) in the seat (12) and provides a signal (82, 86) indicative of the occupant characteristic. The webbing guide stop (70) moves to a stop position which is dependent upon the signal indicative of the occupant characteristic when the occupant (11) is seated in the seat (12) and the vehicle ignition is turned on. An actuator (32), when actuated, causes the guide (28) to move. A second sensor (76) senses vehicle deceleration of at least a predetermined magnitude which is indicative of a vehicle collision requiring actuation of the actuator (32). The actuator (32) actuates to cause the guide (28) and thus the seat belt webbing (26) to move towards the stop (70) at the stop position which is dependent upon the signal indicative of the occupant characteristic when the second sensor (76) senses vehicle deceleration of at least the predetermined magnitude which is indicative of a vehicle collision requiring actuation of the actuator (32).

21 Claims, 3 Drawing Sheets

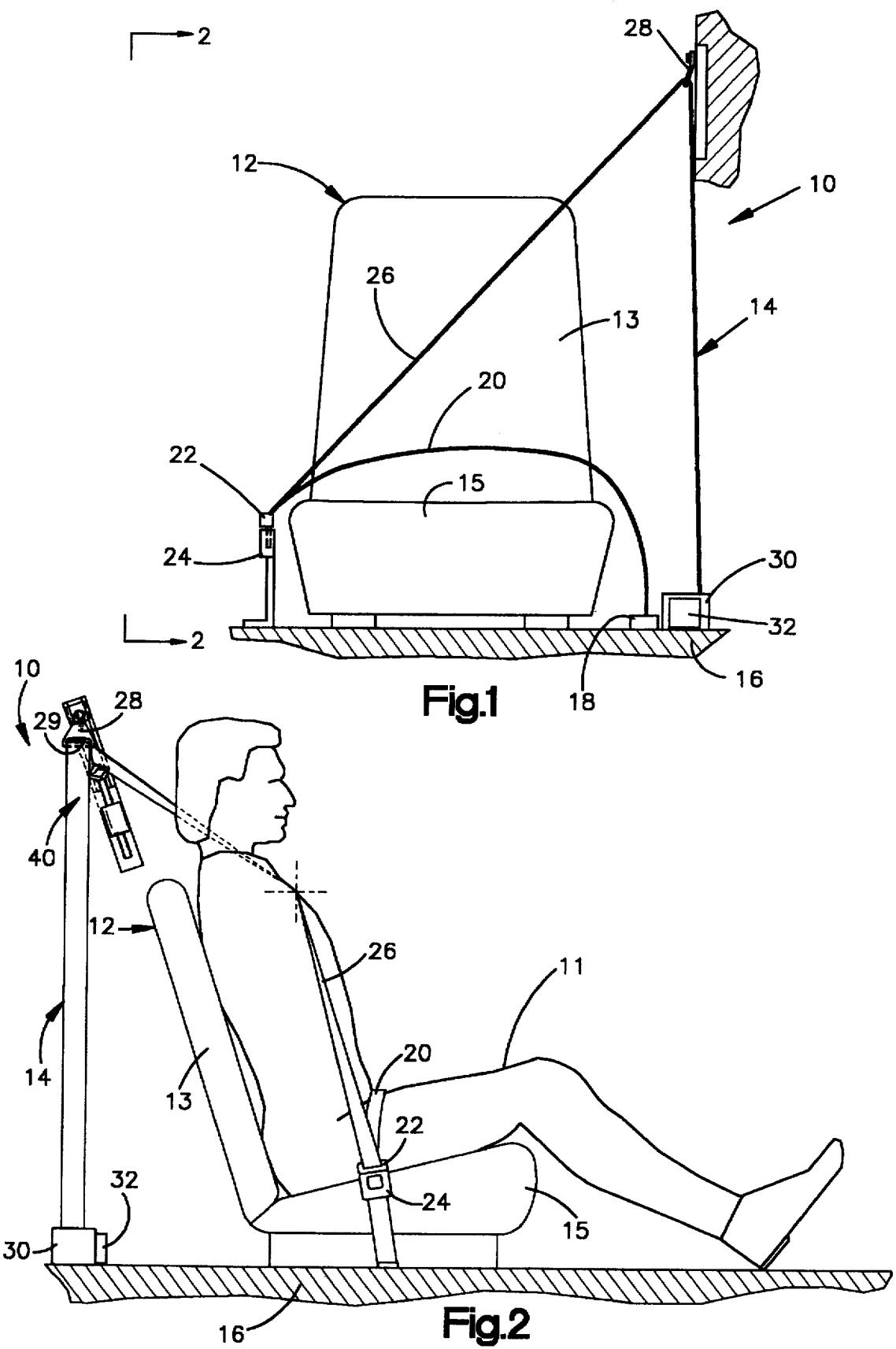

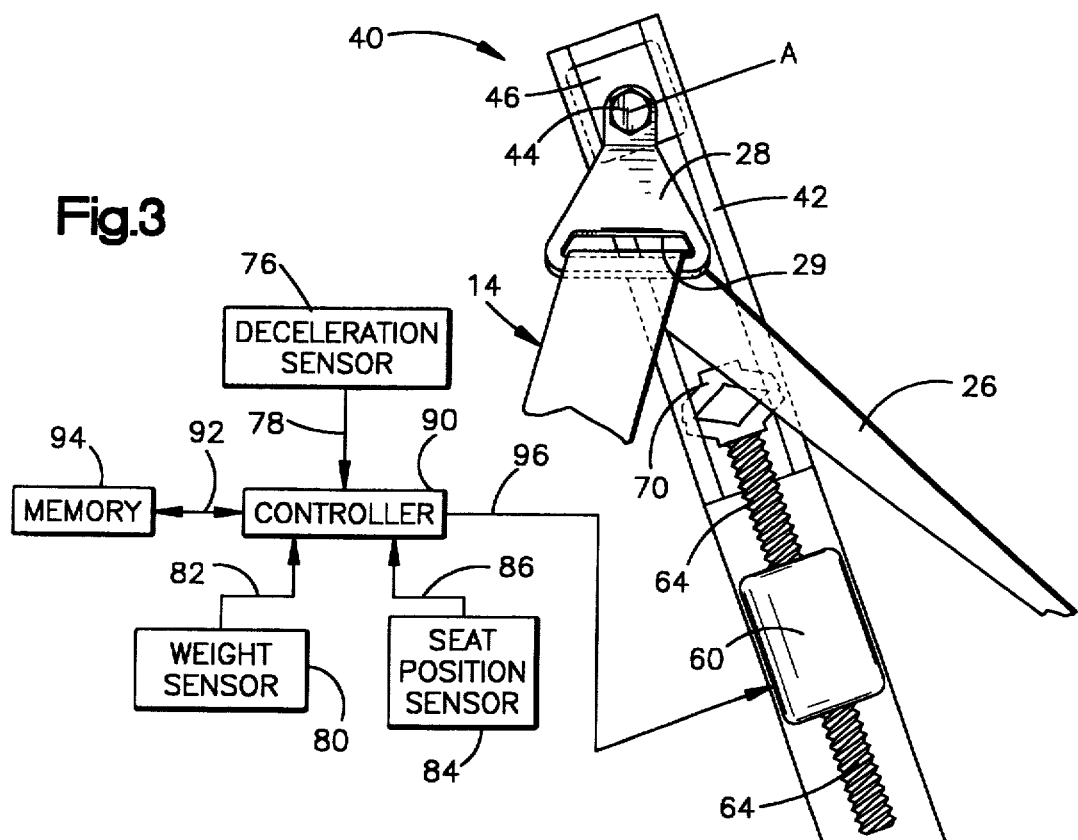
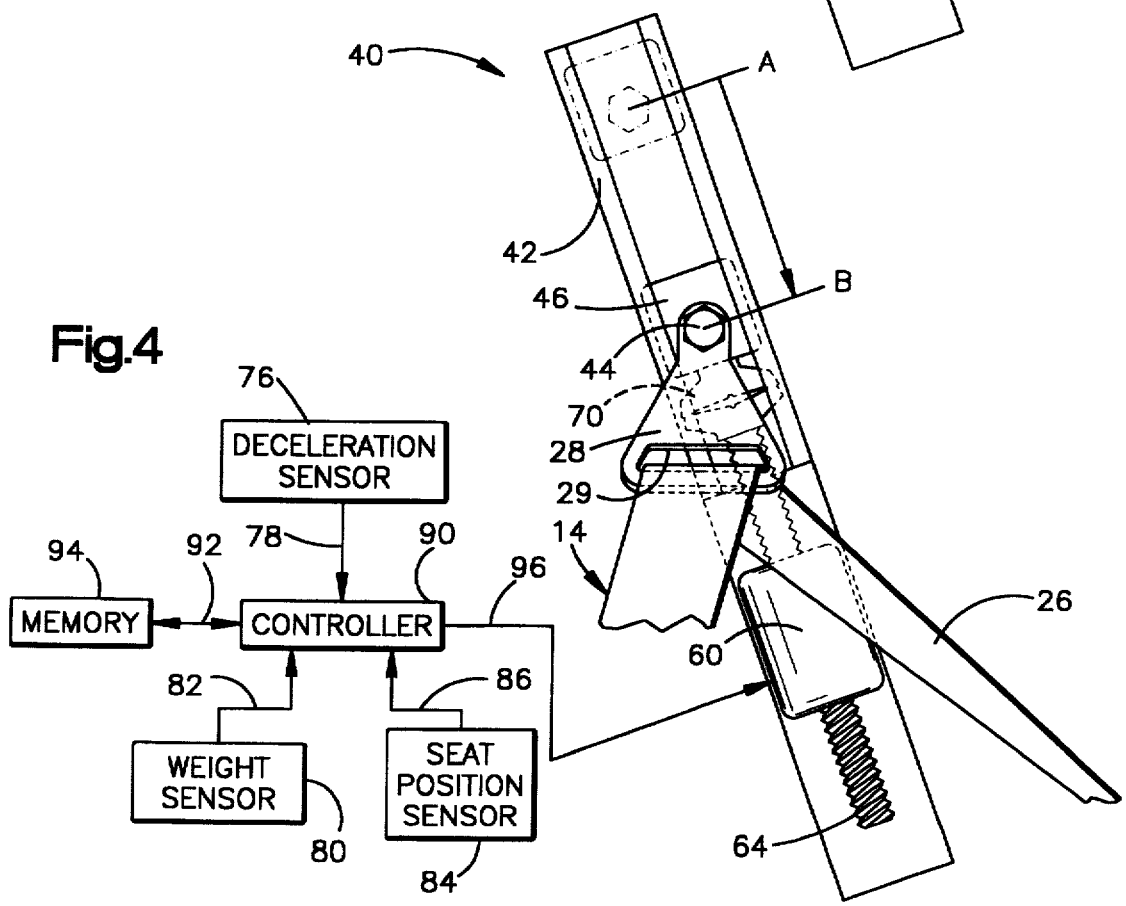

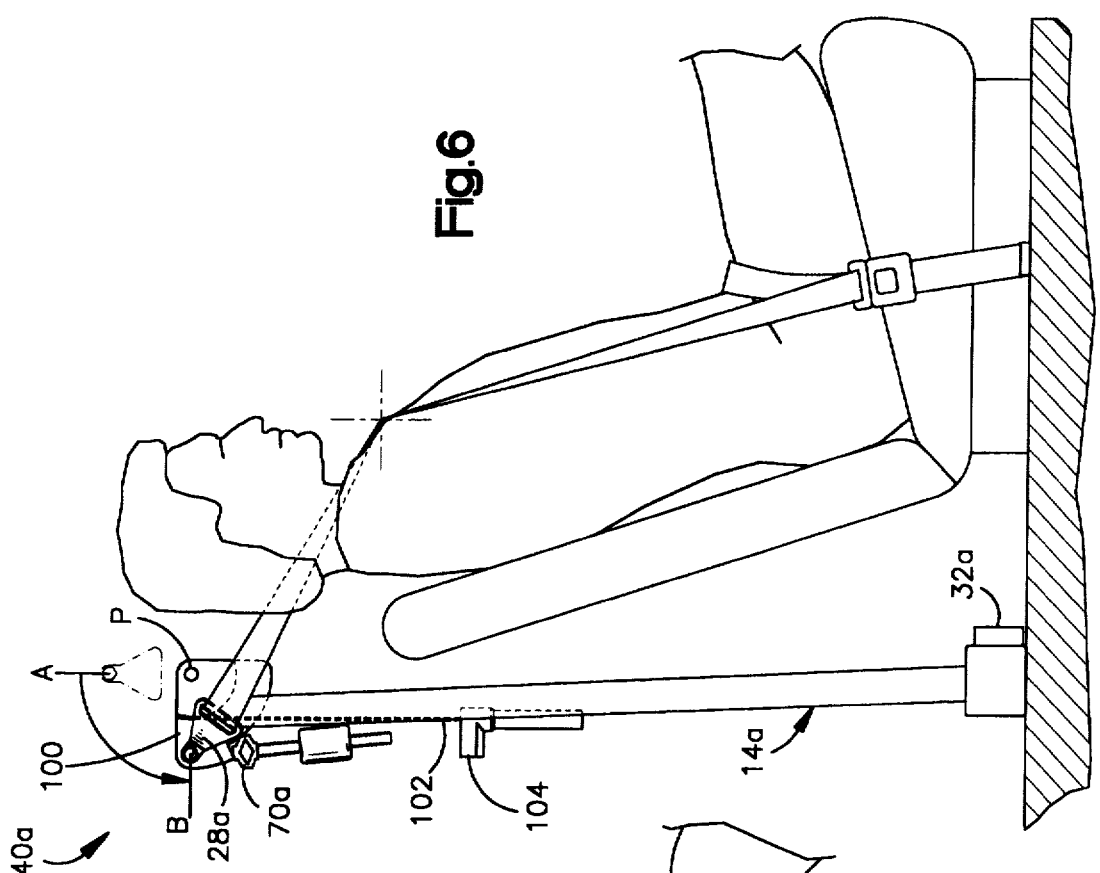
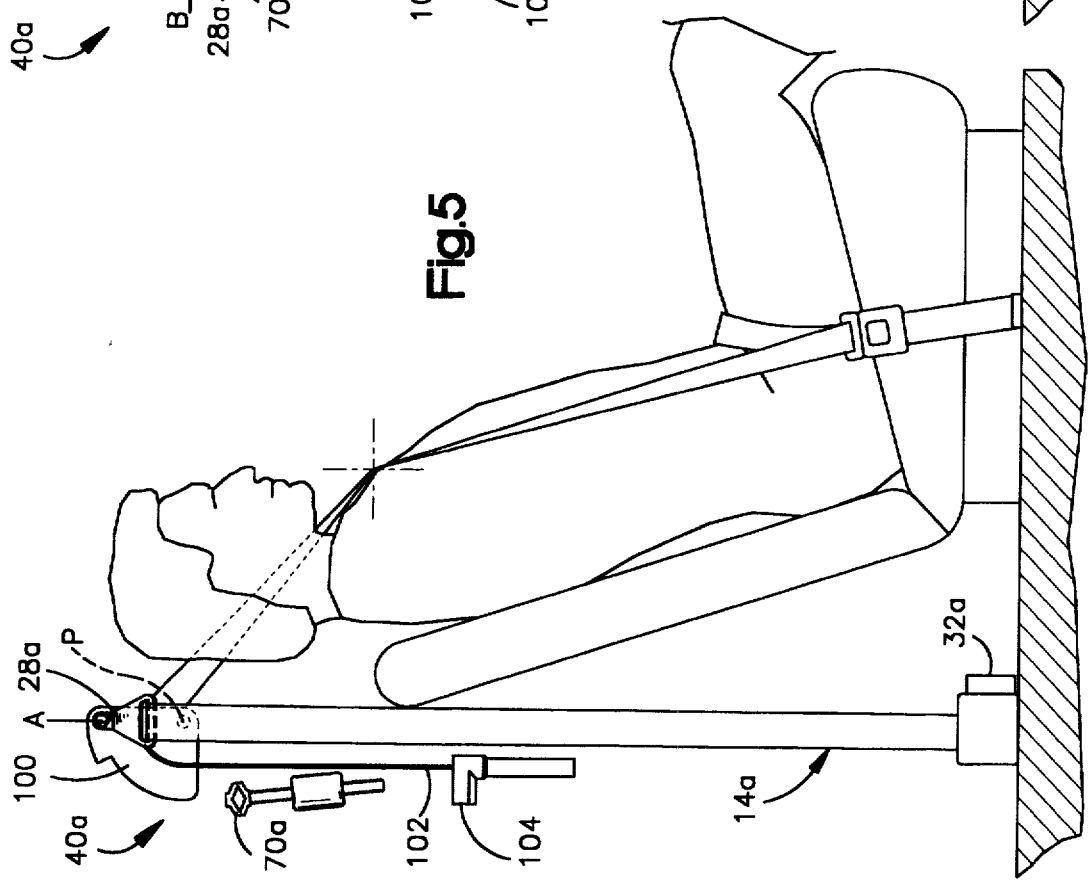

APPARATUS FOR USE IN A VEHICLE OCCUPANT RESTRAINT SYSTEM

TECHNICAL FIELD

The present invention relates to a vehicle occupant restraint system, and is particularly directed to a vehicle occupant restraint system having seat belt webbing and a D-ring which guides the seat belt webbing.

BACKGROUND OF THE INVENTION

Vehicle occupant restraint systems having seat belt webbing and a D-ring which guides the seat belt webbing are known. In many known vehicle occupant restraint systems, the D-ring is adjustable between different positions so that the D-ring and seat belt webbing may be located in the most comfortable position for a vehicle occupant. However, the most comfortable position of the seat belt webbing may not be a good position for occupant restraint during a vehicle collision.

SUMMARY OF THE INVENTION

The present invention is directed to an apparatus for positioning seat belt webbing in a good occupant restraining position during a vehicle collision. The apparatus comprises webbing guide means for guiding the seat belt webbing. Supporting means supports the webbing guide means for movement. Sensing means senses at least one characteristic of an occupant in the vehicle seat and provides a signal indicative of the occupant characteristic. Actuatable means causes the webbing guide means and thus the seat belt webbing to move to a position dependent upon the signal indicative of the occupant characteristic, which position provides good occupant restraint by the seat belt webbing.

The actuatable means preferably includes processing means which receives the signal from the sensing means, a movable webbing guide stop, means controlled by the processing means for moving the webbing guide stop to a position dependent upon the occupant characteristic, and operable means for moving the webbing guide means against the webbing guide stop. Preferably, the operable means includes an actuatable pyrotechnic device which, when actuated, causes the webbing guide means to move.

The occupant characteristic may be the weight of an occupant in the vehicle seat. In this case, the sensing means for sensing the occupant characteristic may include weight sensing means for sensing the weight of an occupant in the vehicle seat and for providing the signal indicative of the occupant characteristic. Alternatively, the occupant characteristic may be the position of an occupant relative to the direction of travel of the vehicle. In this case, the sensing means for sensing the occupant characteristic may include position sensing means for sensing the position of the vehicle seat in the direction of travel of the vehicle and for providing the signal indicative of the occupant characteristic. Also, both the weight of an occupant in the vehicle seat and the position of the vehicle seat could be sensed and the webbing guide means moved to a position depending upon both the weight of the occupant and the position of the occupant in the direction of travel of the vehicle.

Preferably, the means for moving the webbing guide stop is a motor means which, when actuated, moves the stop between different stop positions. Preferably, the motor means includes a positioning screw having opposite ends. The motor means further includes a motor having a drive shaft drivingly connected to one end of the positioning screw. The other end of the positioning screw is connected to the webbing guide stop.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic view of a vehicle seat and a vehicle occupant restraint system embodying an apparatus constructed in accordance with the present invention;

FIG. 2 is a view taken approximately along line 2—2 of FIG. 1 and showing an occupant in the vehicle seat;

FIG. 3 is an enlarged view of a portion of FIG. 2 and showing some additional parts;

FIG. 4 is a view similar to FIG. 3 but showing parts in a different position;

FIG. 5 is a view similar to FIG. 2 and showing another embodiment of the present invention; and FIG. 6 is a view similar to FIG. 5 but showing parts in a different position.

DESCRIPTION OF PREFERRED EMBODIMENTS

The present invention is illustrated in FIGS. 1 and 2 as applied to a three-point vehicle safety belt system 10 for restraining forward movement of a vehicle occupant in the event of vehicle deceleration above a predetermined deceleration, such as occurs in a vehicle collision. It should be understood that the present invention could be applied to other safety belt systems. As shown in FIG. 2, a vehicle occupant 11 is seated on a vehicle seat 12 which is illustrated as a front driver seat in the vehicle. The vehicle seat 12 has a seat back 13 and a seat cushion 15.

The vehicle safety belt system 10 includes a length of seat belt webbing 14 which is extendable about the vehicle occupant 11. One end of the length of seat belt webbing 14 is anchored to the vehicle body 16 at an anchor point 18. A lap belt section 20 of the seat belt webbing 14 extends across the seat cushion 15 of the vehicle seat 12 to a tongue assembly 22 received in a buckle 24 secured to the vehicle body 16. A shoulder belt section 26 of the seat belt webbing 14 extends from the tongue assembly 22 upwardly across the seat back 13 to a seat belt webbing guide in the form of a D-ring 28. The seat belt webbing 14 passes through an opening 29 in the D-ring 28 and extends vertically downward to an emergency locking seat belt retractor 30 having an actuatable seat belt pretensioner 32 of any known construction. Since the structure and operation of the seat belt pretensioner 32 are known, such will not be described herein.

A D-ring assembly 40 constructed in accordance with the present invention is illustrated in FIG. 3. The D-ring assembly 40 includes the D-ring 28, a D-ring track 42, and a D-ring bracket 46 slidable along the track 42 in a generally vertical direction. The track 42 is mounted on the B-pillar (not shown) of the vehicle. The track 42 may lie along a line parallel to the centerline of the B-pillar of the vehicle. The D-ring 28 is secured by a bolt 44 to the bracket 46. The bracket 46 supports the D-ring 28 for sliding movement along the track 42.

An electric drive motor 60 is disposed at one end of the track 42, as shown in FIG. 3. The motor 60 has a drive shaft which is drivingly connected to one end of a positioning screw 64. The other end of the positioning screw 64 is attached to a D-ring stop 70. The motor 60 is controlled to turn the positioning screw 64 so as to move the stop 70 along the track 42.

The stop 70 can be engaged by the bracket 46 as the bracket 46 slides along the track 42. The stop 70 is made of a material which is capable of absorbing kinetic energy of the bracket 46. As illustrated, the stop 70 is made of metal and has a shape such that the stop 70 is crushed by engagement with the bracket 46 to absorb some kinetic energy of the bracket 46. When the stop 70 is crushed, it expands laterally and frictionally locks to the track 42 so that it does not move relative to the track 42.

As schematically shown in FIG. 3, a deceleration sensor 76 provides an output signal on line 78 which is indicative of the vehicle experiencing deceleration of at least a predetermined magnitude which is indicative of a vehicle collision requiring actuation of the seat belt pretensioner 32. A weight sensor 80 provides an output signal on line 82 corresponding to the weight of the occupant 11 in the vehicle seat 12. The weight sensor 80 may be located in the seat cushion 15 of the vehicle seat 12 and may be a piezoelectric type of sensor. Alternatively, the weight sensor 80 could be a weight scale mounted to seat bolts, for example. Also, as schematically shown in FIG. 3, a seat position sensor 84 provides an output signal on line 86 corresponding to the position of the vehicle seat 12, and therefore the position of the occupant 11 in the vehicle seat, in the direction of travel of the vehicle. The position sensor 84 may be, for example, a potentiometer having its shaft operatively connected to the vehicle seat 12. The output signals on lines 78, 82, 86 from the sensors 76, 80, 84 are electrically connected to a controller 90 such as a microcomputer.

The microcomputer 90 communicates via bus lines 92 with a memory 94 external to the microcomputer 90. The microcomputer 90 monitors the output signals on lines 78, 82, 86 from the sensors 76, 80, 84. The microcomputer 90 generates a motor control signal on line 96 to control operation of the motor 60 to pre-position the stop 70 along the track 42. The motor control signal on line 96 depends upon the output signals on lines 82, 86 from the sensors 80, 84. The motor control signal on line 96 is generated in accordance with a preprogrammed procedure stored in the external memory 94 and/or an internal memory of the microcomputer 90. Microcomputers are readily available in the commercial marketplace. Their structure and operation are known and, therefore, are not described herein.

As an example, a value indicative of a characteristic or characteristics of an occupant 11 may be stored in the memory 94. The microcomputer 90 would compare this stored value with either the output signal on line 82 from the weight sensor 80 and/or the output signal on line 86 from the seat position sensor 84 to generate the motor control signal on line 96 which is applied to the motor 60. The motor 60 would be controlled such that the stop 70 moves to a position dependent upon the comparison of the stored value in the memory 94 and either the output signal on line 82 and/or the output signal on line 86.

The D-ring 28 is shown in FIG. 3 in a normal position to which the D-ring 28 was adjusted by the occupant 11. The D-ring 28 is held in its normal position by, for example, a frictional latch which comprises frictional engagement between the bracket 46 and the track 42. Alternatively, a mechanical latch could be used to latch the bracket 46 in position. The D-ring 28 is movable from its normal position "A" shown in FIG. 3 to a relocated position "B", such as shown in FIG. 4, upon release of the latch.

In the event of a vehicle collision, the seat belt pretensioner 32 is actuated to take up slack in the seat belt webbing 14 and tension the seat belt webbing 14, as is known. The tension force in the seat belt webbing 14 due to the pretensioner 32 is applied to the D-ring 28 such that the D-ring 28 is pulled downward from its normal position "A" shown in FIG. 3. The D-ring 28 continues moving downward until the bracket 46 engages and crushes the stop 70 as shown in FIG. 4.

As the stop 70 is being crushed, kinetic energy of the bracket 46 is absorbed. Also, as the stop 70 is being crushed, the material of the stop 70 collapses and wedges against the walls of the track 42 to lock the stop 70 in place relative to the track 42. The crushing of the material of the stop 70 absorbs some kinetic energy of the bracket 46.

When the bracket 46 engages and crushes the stop 70, the D-ring 28 is in a relocated position such as shown in FIG. 4. The relocated position to which the D-ring 28 moves depends upon the location of the stop 70 along the track 42. When the D-ring 28 is in the relocated position such as shown in FIG. 4, the seat belt webbing 14 is also in a relocated position such as shown in FIG. 4. Thus, the seat belt webbing 14 moves to a relocated position, such as shown in FIG. 4, when the seat belt pretensioner 32 is actuated in response to occurrence of a vehicle collision.

It should be apparent that the D-ring 28 can be initially located at a normal position which provides optimum comfort for the occupant. After the occupant 11 is seated in the vehicle seat 12 and the vehicle ignition is turned on, the stop 70 is pre-positioned into a location dependent upon at least one occupant characteristic so that the D-ring 28 can be relocated in the event of a vehicle collision. For example, if the weight of the occupant 11 in the vehicle seat 12 is relatively small and/or the position of the occupant 11 in the vehicle seat 12 is relatively rearward of the vehicle, the stop 70 may be prepositioned such that the D-ring 28 can move relatively far downward to improve occupant restraint in the event of a vehicle collision. If the weight of the occupant 11 in the vehicle seat 12 is relatively large and/or the position of the occupant 11 in the vehicle seat 12 is relatively forward of the vehicle, the stop 70 may be pre-positioned such that the D-ring 28 cannot move as far downward in the event of a vehicle collision.

Another embodiment of the present invention is illustrated in FIGS. 5 and 6. Since the embodiment of the invention illustrated in FIGS. 5 and 6 is generally similar to the embodiment of the invention illustrated in FIGS. 1–4, similar numerals are utilized to designate similar components, the suffix letter "a" being added to the numerals of the embodiment of FIGS. 5 and 6 to avoid confusion.

The D-ring assembly 40a includes a cam plate 100 to which the D-ring 28a is securely attached. The cam plate 100 is securely attached to the vehicle, such as at the vehicle B-pillar (not shown), and is pivotable about a pivot point designated with reference letter "P" in FIG. 5. One end of a cable 102 is operatively connected to an actuatable pyrotechnic driver 104. The opposite end of the cable 102 is operatively connected to the cam plate 100 such that the cam plate 100 pivots about point P when tension is applied to the cable 102 in response to actuation of the pyrotechnic driver 104. The D-ring 28a is shown in FIG. 5 in the normal position. The D-ring 28a is movable from its normal position "A" shown in FIG. 5 to a relocated position "B", such as shown in FIG. 6.

In the event of a vehicle collision, the pyrotechnic driver 104 is actuated so that the cam plate 100 is pivoted about point P from its normal position "A" shown in FIG. 5. The cam plate 100 continues pivoting about point P until the cam plate 100 engages the stop 70a as shown in FIG. 6. The stop 70a shown in FIGS. 5 and 6 is constructed and operates in the same manner as the stop 70 described hereinabove with regard to the embodiment shown in FIGS. 1–4. When the cam plate 100 engages the stop 70a, the D-ring 28a is in a relocated position "B", such as shown in FIG. 6.

When the cam plate 100 is in the relocated position shown in FIG. 6, the seat belt webbing 14a is also in a relocated position, as shown in FIG. 6. The relocated position to which the seat belt webbing 14a moves depends upon the location of the stop 70a. Since the D-ring 28a is relocated using the pyrotechnic driver 104; the D-ring 28a is relocated quickly during a vehicle collision (typically within the first 10 to 25 ms during the initial phase of the vehicle collision). Immediately after actuation of the pyrotechnic driver 104, the seat belt pretensioner 32a is actuated to take up slack in the seat belt webbing 14a and tension the seat belt webbing 14a, as is known.

From the above description of the invention, those skilled in the art to which the present invention relates will perceive improvements, changes and modifications. Such improvements, changes and modifications within the skill of the art to which the present invention relates are intended to be covered by the appended claims. For example, the stop 70 shown in FIG. 3 may be made of an energy absorbing elastomeric material and some means provided for locking the stop to the track 42 where the stop is engaged by the bracket 46 other than the crushing of the stop. Moreover, the stop 70 could be shaped to cooperate with the bracket 46 and absorb energy when engaged by the bracket.

Having described the invention, the following is claimed:

1. An apparatus for use in a vehicle having a vehicle seat and seat belt webbing extendable around an occupant in the vehicle seat, said apparatus comprising:

webbing guide means for guiding the seat belt webbing;

supporting means for supporting said webbing guide means for movement;

first sensing means for sensing at least one characteristic of an occupant in the vehicle seat and for providing a signal indicative of said occupant characteristic; and actuatable means actuatable in response to a condition indicative of a vehicle collision for causing said webbing guide means to move to a position dependent upon said signal indicative of said occupant characteristic.

2. An apparatus according to claim 1 further comprising second sensing means for sensing vehicle deceleration of at least a predetermined magnitude which is indicative of a vehicle collision requiring actuation of said actuatable means and for providing a signal indicative thereof.

3. An apparatus according to claim 2 wherein said actuatable means includes and actuatable pyrotechnic device which, when actuated in response to said second sensing means providing said signal indicative of a vehicle collision requiring actuation of said actuatable means, causes said webbing means to move to said position dependent upon said signal indicative of said occupant characteristic.

4. An apparatus according to claim 3 further comprising an actuatable device which, when actuated in response to said second sensing means providing said signal indicative of a vehicle collision requiring actuation of said actuatable means, pretensions the seat belt webbing which extends around the occupant in the vehicle seat.

5. An apparatus according to claim 1 wherein said occupant characteristic is the weight of the occupant in the vehicle seat, and said first sensing means includes weight sensing means for sensing the weight of the occupant in the vehicle seat and for providing said signal indicative of said occupant characteristic.

6. An apparatus according to claim 1 wherein said occupant characteristic is the position of the occupant in the vehicle seat relative to the forward and rearward directions of travel of the vehicle, and said first sensing means includes position sensing means for sensing the position of the occupant in the vehicle seat and for providing said signal indicative of said occupant characteristic.

7. An apparatus according to claim 1 wherein (i) said supporting means includes means for supporting said webbing guide means for linear movement relative to a frame part of the vehicle and (ii) said actuatable means includes means for causing said webbing guide means to move linearly relative to the frame part of the vehicle upon actuation of said actuatable means.

8. An apparatus for use in a vehicle having a vehicle seat and seat belt webbing extendable around an occupant in the vehicle seat, said apparatus comprising:

webbing guide means for guiding the seat belt webbing;

supporting means for supporting said webbing guide means for movement;

first sensing means for sensing at least one characteristic of an occupant in the vehicle seat and for providing a signal indicative of said occupant characteristic;

actuatable means for, when actuated, causing said webbing guide means to move to a position dependent upon said signal indicative of said occupant characteristic; and control means responsive to said signal indicative of said occupant characteristic for limiting movement of the webbing guide means comprising processing means for receiving said signal from said first sensing means, a movable webbing guide stop, moving means controlled by said processing means for moving said webbing guide stop to a position dependent upon said occupant characteristic, and means for engaging said webbing guide means against said webbing guide stop.

9. An apparatus according to claim 8 further comprising memory means for storing a value indicative of said characteristic of an occupant in the vehicle seat.

10. An apparatus according to claim 9 wherein said processing means comprises means for comparing said signal from said first sensing means and said stored value in said memory means, said moving means moving said webbing guide stop to a position dependent upon said comparison of said signal from said first sensing means and said stored value in said memory means.

11. An apparatus according to claim 10 wherein said moving means includes a positioning screw and a motor for moving said positioning screw.

12. An apparatus according to claim 8 wherein said webbing guide stop includes means for absorbing kinetic energy of said webbing guide means when said webbing guide means is stopped and located at said position dependent upon said occupant characteristic.

13. An apparatus for use in a vehicle having a vehicle seat and seat belt webbing extendable around an occupant in the vehicle seat, said apparatus comprising:

webbing guide means for guiding the seat belt webbing;

supporting means for supporting said webbing guide means for movement;

stop means movable between different stop positions for stopping movement of said webbing guide means;

actuatable motor means for, when actuated, moving said stop means between the different stop positions; and actuatable means for, when actuated, causing said webbing guide means to move to a position dependent upon a stop position of said stop means.

14. An apparatus according to claim 13 wherein said actuatable means includes a first actuatable pyrotechnic device which, when actuated, causes said webbing guide means to move to said position dependent upon the stop position of said stop means.

15. An apparatus according to claim 14 further comprising a second actuatable pyrotechnic device which, when actuated, pretensions the seat belt webbing which extends around the occupant in the vehicle seat.

16. An apparatus according to claim 13 wherein said stop means includes a D-ring stop.

17. An apparatus according to claim 16 wherein said motor means includes (i) a positioning screw having opposite ends and (ii) a motor for moving said positioning screw, one end of said positioning screw being connected to said D-ring stop.

18. An apparatus according to claim 13 wherein said stop means includes means for absorbing kinetic energy of said webbing guide means when said webbing guide means is stopped and located at said position dependent upon the stop position of said stop means.

19. An apparatus according to claim 13 wherein (i) said supporting means includes means for supporting said webbing guide means for linear movement relative to a frame part of the vehicle and (ii) said actuatable means includes means for causing said webbing guide means to move linearly relative to the frame part of the vehicle upon actuation of said actuatable means.

20. An apparatus according to claim 13 wherein (i) said supporting means includes means for supporting said webbing guide means for pivotal movement about a fixed point on the vehicle and (ii) said actuatable means includes means for causing said webbing guide means to pivot about the fixed point on the vehicle upon actuation of said actuatable means.

21. An apparatus for use in a vehicle having a vehicle seat and seat belt webbing extendable around an occupant in the vehicle seat, said apparatus comprising:

webbing guide means for guiding the seat belt webbing;

supporting means for supporting said webbing guide means for movement;

first sensing means for sensing at least one characteristic of an occupant in the vehicle seat and for providing a signal indicative of said occupant characteristic; and actuatable means for, when actuated, causing said webbing guide means to move to a position dependent upon said signal indicative of said occupant characteristic;

said supporting means including means for supporting said webbing guide means for pivotal movement about a fixed point on the vehicle, and said actuatable means including means for causing said webbing guide means to pivot about the fixed point on the vehicle upon actuation of said actuatable means.

\* \* \* \* \*

UNITED STATES PATENT AND TRADEMARK OFFICE
CERTIFICATE OF CORRECTION

PATENT NO. : 5,615,917
DATED : April 1, 1997
INVENTOR(S) : Barney J. Bauer

It is certified that error appears in the above-indentified patent and that said Letters Patent is hereby corrected as shown below:

Column 5, line 58, change "and" to --an--.

Column 5, line 62, after "webbing" insert --guide--.

Signed and Sealed this

First Day of July, 1997

Attest:

BRUCE LEHMAN

Attesting Officer

Commissioner of Patents and Trademarks